Jan. 2, 1951 A. W. LELINE 2,536,453

PHONOGRAPH RECORD CHANGER

Original Filed Jan. 21, 1941 5 Sheets-Sheet 1

INVENTOR.
ARNOLD W. LELINE
BY Richey & Watts
ATTORNEYS

INVENTOR.
ARNOLD W. LELINE
BY J. D. Douglas

Jan. 2, 1951 A. W. LELINE 2,536,453

PHONOGRAPH RECORD CHANGER

Original Filed Jan. 21, 1941 5 Sheets-Sheet 3

INVENTOR.
ARNOLD W. LELINE
BY Richey & Watts
ATTORNEYS.

Jan. 2, 1951 A. W. LELINE 2,536,453

PHONOGRAPH RECORD CHANGER

Original Filed Jan. 21, 1941 5 Sheets-Sheet 4

INVENTOR.
ARNOLD W. LELINE
BY Richey & Watts
ATTORNEYS

INVENTOR.
ARNOLD W. LELINE
BY Richey & Watts
ATTORNEYS

Patented Jan. 2, 1951 2,536,453

UNITED STATES PATENT OFFICE 2,536,453

PHONOGRAPH RECORD CHANGER

Arnold W. Leline, Chicago, Ill., assignor, by mesne assignments, to Admiral Corporation, Chicago, Ill., a corporation of Delaware Original application January 21, 1941, Serial No. 375,179. Divided and this application March 23, 1944, Serial No. 527,800

6 Claims. (Cl. 274—10)

This invention relates to improvements in record changers, and more particularly to a type of record changer wherein the records of a group are played on one side only, being stacked above the turntable and dropped down onto the turntable one at a time.

This application is a division of my co-pending application, filled January 21, 1941, Serial No. 375,179, Patent No. 2,352,331, of June 27, 1944.

Although record changers of the type stated are well known, there have been many disadvantages incorporated in these devices which it is the purpose of the present invention to overcome. Generally, these prior changers have included the type where the record is supported at two or more opposite points adjacent the periphery and the bottom record released by providing blades which slide between the records. These changers are commonly known as the "slicer type" changers, the name being derived from the slicing action of the blades. This type of machine has several disadvantages, among which may be enumerated: the mutilation of edges of the recorders by the changing mechanism; the inconvenience of removing played records from the turntable; and the more complicated mechanism for operating the changer mechanism. The other well known type comprises those where the record is supported on one edge by a platform and by a post or spindle through the center hole in the record. These machines have also been relatively complicated and in operation often cause the records to be mutilated at the center, thus making them ineffective for further automatic use.

The present invention is concerned particularly with a changer mechanism where the records are disposed in a substantially horizontal position, being supported at the center of the records on a center post and at one edge by a table, and wherein the objectionable features of the prior art device are eliminated.

Among the other disadvantages of the prior record changers has been that of speed variation of the turntable due to increased friction when the number of played records, and hence the weight on the turntable, has increased. Previously, plain bearings were used because the irregularities of the balls in ball bearings and the raceways caused vibrations from the bearings to be transmitted to the turntable which in turn was picked up and carried into the amplifier the same as any other vibrations.

It is therefore an object of my invention to provide an improved record changer which does not excessively wear, break or mutilate the records.

Another object of my invention is to provide a record changer that is simple and easy to load with unplayed records and unload the stack of played records.

Another object of the invention is to provide a mechanism where, when an undesired record is being played, it may be rejected at any time to cause the next record to be played.

Another object of my invention is to provide a record changing mechanism wherein the time consumed in the record changing cycle is greatly reduced.

Another object of my invention is to provide a simple rugged record changer and playing mechanism wherein the speed of the turntable is not affected by the presence of more than one record and wherein bearing noises in the turntable bearings are dampened.

Another object of my invention is to provide a simple, rugged record changer mechanism which is not easily thrown out of adjustment and which is compact, having but a few working parts.

Still another object of my invention is to provide a record changer which may be quickly, easily and simply adjusted to play records of different size.

Other objects of the invention including those of economies of manufacture and construction, and the invention itself, will become more apparent from the following description of an embodiment thereof, which description is illustrated by the accompanying drawings, and forms a part of this specification.

Figure 1:
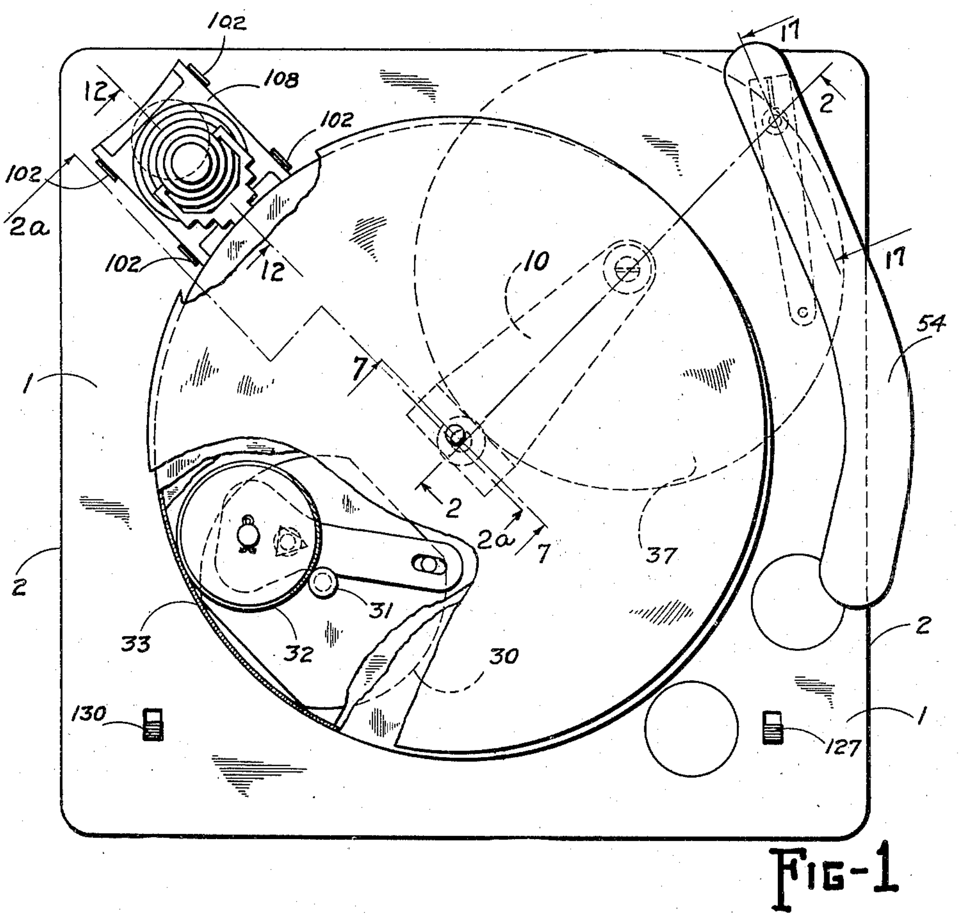
Fig. 1 is a plan view of the record changer of the invention, some of the parts being broken away to show more clearly other parts below and certain otherwise hidden parts being indicated by dotted lines.
Figure 2:
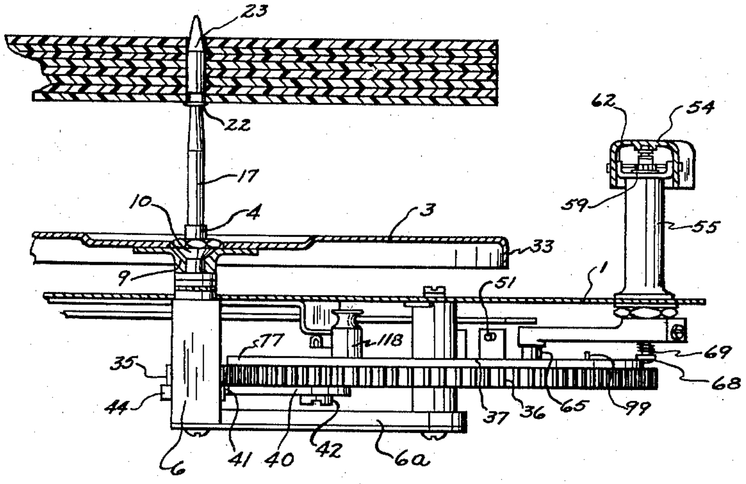
Fig. 2 is a vertical section taken along the line 2—2 of Fig. 1, certain parts being shown in elevation.
Figure 2A:
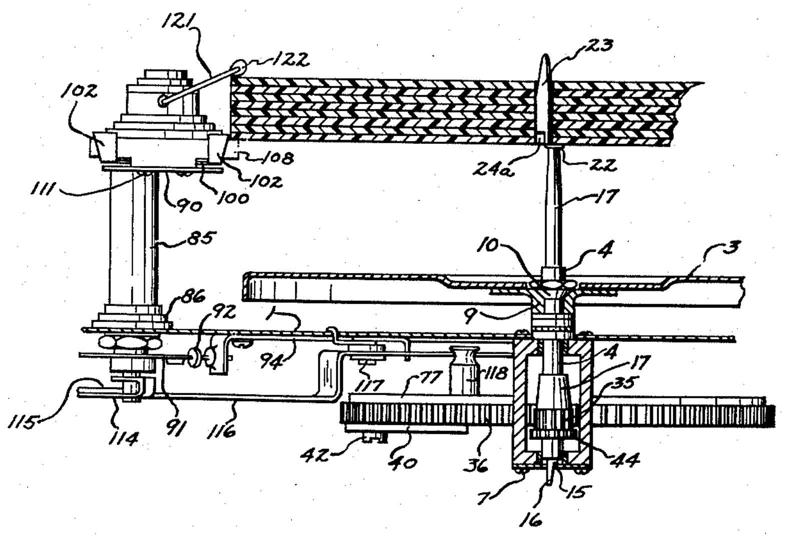
Figures 3, 3A, 4, 9A, 10, 11:
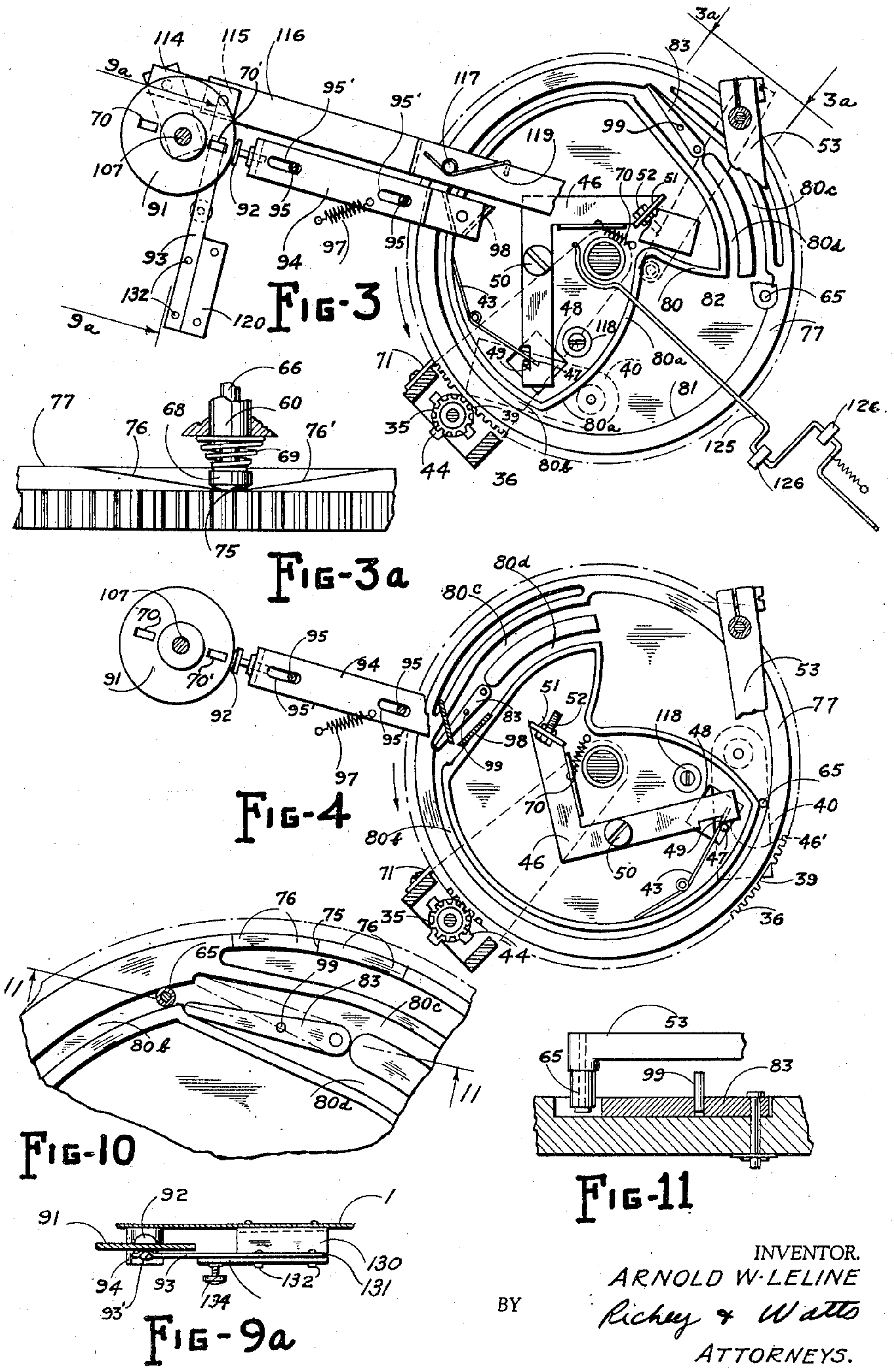
Figures 5, 6, 7, 8, 9:
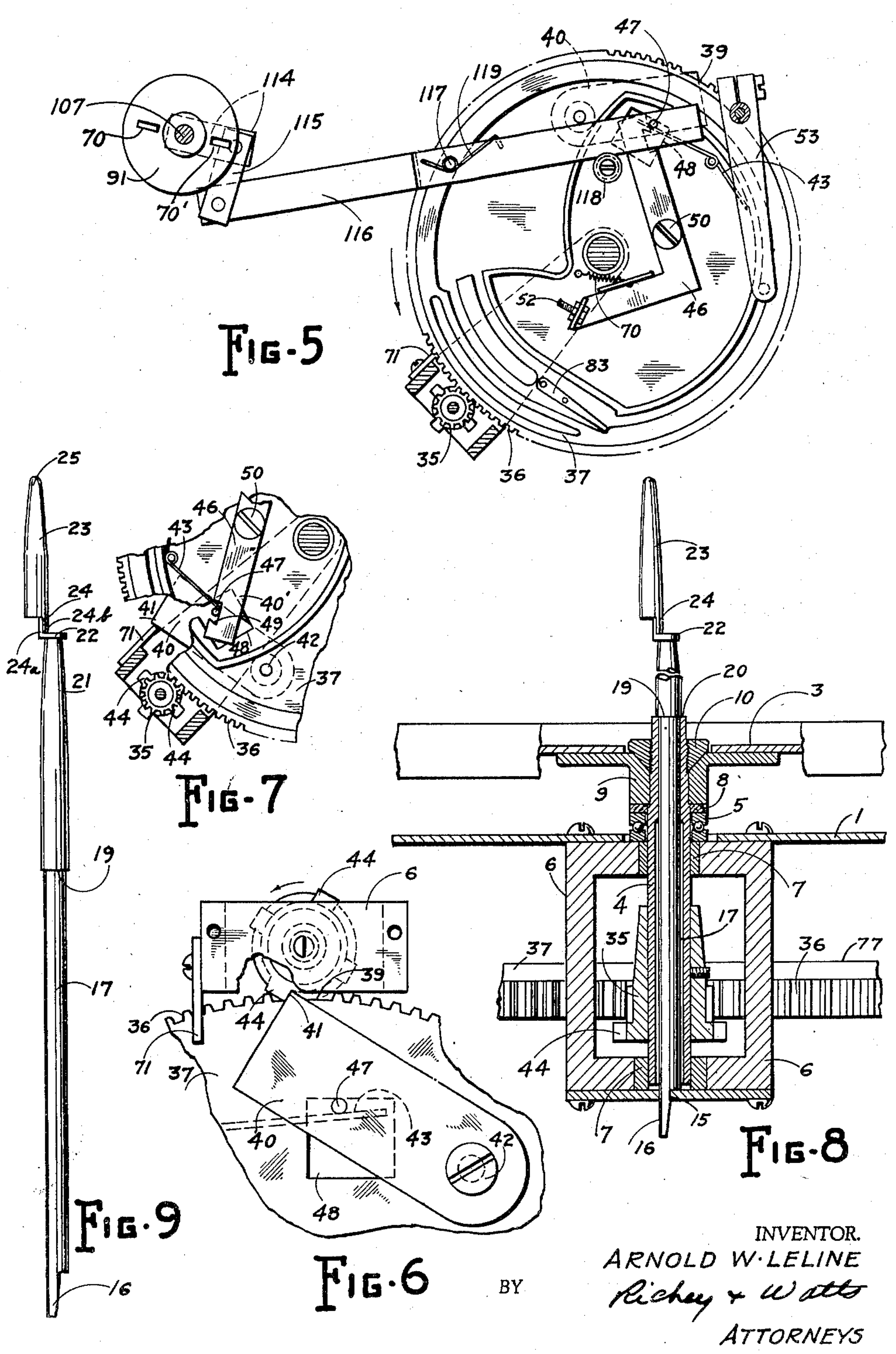
Figures 12, 13, 14, 15, 16, 17:
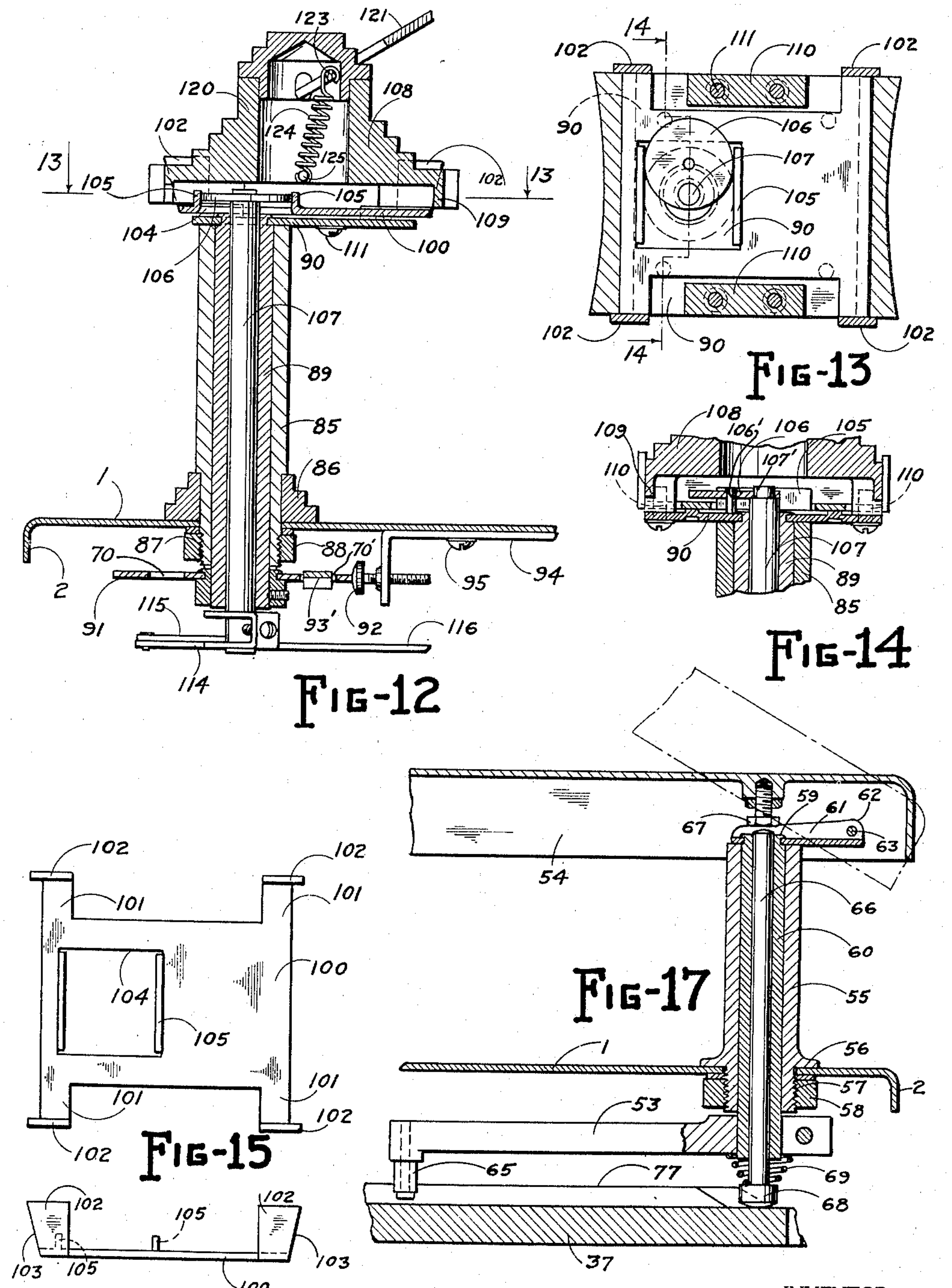

Fig. 2*a* is a similar view taken on the line **2*a*—2*a*** of Fig. 1;

Fig. 3 is a horizontal section taken below the main table or frame of the changer and showing in plan view the main cam and linkages for effecting the record changing cycle, the position shown for the parts being during the record playing cycle;

Fig. 3*a* is a fragmentary side elevation taken on a plane from the line **3*a*—3*a*** of Fig. 3;

Fig. 4 is a view similar to Fig. 3 showing the position taken by the parts at another time during the record changing cycle, certain of the parts being omitted and others broken away for the sake of clarity;

Fig. 5 is a view similar to Figs. 3 and 4 at another time during the record changing cycle, and with other parts omitted for the purpose of clarity;

Fig. 6 is a fragmentary bottom plan view of the cam and the starting dog and associated parts, showing the position taken by them after the dog is tripped;

Fig. 7 is a fragmentary top plan view of the main cam and cam starting dog showing their relative position near the end of the record changing cycle;

Fig. 8 is an enlarged vertical medial section through the record and turntable spindle and associated parts;

Fig. 9 is an elevational view of the unplayed record supporting spindle;

Fig. 9*a* is a detail view of a cam indexing spring;

Fig. 10 is an enlarged detail plan showing the pickup arm track switch, an alternate position of the cam being shown in dotted lines;

Fig. 11 is a section taken on the line 11—11 of Fig. 10;

Fig. 12 is a vertical medial section through the record changing support;

Fig. 13 is a section taken on the line 13—13 of Fig. 12;

Fig. 14 is a fragmentary section taken on the line 14—14 of Fig. 13;

Figs. 15 and 16 are plan and elevational views respectively of the record changing slide; and Fig. 17 is a vertical medial section through the pickup arm supporting post showing the arm raising and swinging members.

In the drawings, like parts have been designated by like reference characters.

Briefly, the invention includes a turntable, for turning the records to be played, a rotatably supported cam member is provided for operating the mechanism which effects the record changing operations. This cam member has a mutilated gear on its periphery which meshes with a gear on the spindle for approximately one revolution of the cam member. During the one revolution of the cam member one cam surface on the member raises the pickup arm from the record; another swings the pickup arm away from and into position over the record. While the pickup arm is swung to one side of the record turntable, a pin on said cam engages a linkage connected to the record changing mechanism, and a record is slid from under the bottom of the stack and dropped onto the turntable. Means is provided in the form of a linkage controlled by the size of the records being played to definitely determine the return position of the pickup arm so that it is properly positioned for playing either 10″ or 12″ records.

More specifically, the apparatus comprises a generally rectangular or square frame 1 formed of pressed metal and having a downwardly extending peripheral flange 2. The entire mechanism is supported by this frame and the frame itself may in turn be placed in any suitable cabinet or console.

A turntable 3 is provided and is seated on a hollow spindle 4 which is in turn rotatably journalled in bearings carried by a sub-frame 6. The sub-frame 6 comprises a generally square frame secured by screws at its upper end to the frame 1. The frame is provided with aligned bearings 7 in the upper and lower extremity (see Fig. 8) for holding the spindle 4 rotatably and against lateral movement. A thrust bearing 5 is provided and rests on top of the frame 6 surrounding the spindle 4. The turntable has a hub 9 which is telescoped over the end of the spindle 4, and which hub rests on the thrust bearing 5. A cork or other resilient washer 8 is interposed between the end of the hub and bearing 5 for absorbing vibrations of the bearing 5. In the lower end of the sub-frame there is provided a semi-circular hole 15 which is coaxial with the opening through the spindle; this hole is for receiving the semi-cylindrical end 16 of the record spindle 17 and holding the same against rotation. The turntable is secured in place by a conical hex nut 10 which is threaded on the threaded portion of the spindle. The bearings 7 prevent lateral movement of the spindle while the bearing 5 carries the downward thrust.

The record holding spindle, as best shown in Fig. 9, comprises a straight cylindrical body portion 17 adapted to be slidably disposed in the bore of the turntable spindle 4. The record holding spindle remains stationary while the spindle 4 revolves; this is effected by engagement of the end 16 of the spindle in the complementary hole 15, which hole is in the plate secured to the bottom of the frame 6. The body of the record spindle is provided with a shoulder 19 adapted to rest on the end 20 of the turntable spindle 4.

The record spindle 17 has a record guiding portion which extends upward above the turntable spindle 4, a distance which is determined by the thickness of a stack of records to be played, additional room being allowed for the reciprocation of the pickup arm, and gradually diminishes in diameter in a zone 21, which zone terminates in a record supporting head or a shoulder 22 which is of a diameter slightly smaller than the center hole in a record. The spindle 17 terminates in a generally cylindrical extension 23 which extends in prolongation of the spindle body but is offset therefrom. The body is connected to the head 22 by a neck 24 which is of a length equal in thickness to the thickest commercial 10″ or 12″ record. The side 24*a* of the neck 24 lies in the same plane with the periphery of the head 22 while the side 24*b* is a semicylindrical surface in prolongation of the body 23, which body is of a diameter slightly less than the diameter of a record center hole and of sufficient length to hold the desired stack of records. The end 25 may be tapered or rounded to permit the records to be easily slipped over the spindle.

In operation the centers of the stack of records are engaged at the periphery of the center hole by the body 23 while the lowermost record rests on the head 22, but may be slipped laterally to the right as best seen from Fig. 2 over against the neck 24*a*, after which it may fall over the head 22 and slide down the shaft or body 17. The zone 21 of reduced diameter prevents the record from becoming wedged on the spindle due to tilting.

The turntable may be driven in any suitable manner such as by a geared or direct drive connection to the spindle 4. I have found, however, that one preferable form, both from the standpoint of smoothness of drive and economy, is provided by a motor 30 (Fig. 1) which has a drive wheel 31 in frictional contact with a rubber rimmed wheel 132 which is in turn in frictional driving contact with the inside of the downwardly extending rim flange 33 on the turntable 3.

Driving of the record changing mechanism is accomplished by a spur gear 35 secured to or integral with the spindle 4. This gear is adapted to mesh with a gear 36 on a main cam member 37. The cam member 37 is rotatably supported on an axle 38 (Fig. 2) connected between the frame 1 and an arm 6a on the lower sub-frame 6. Besides carrying the cams and parts for controlling the various movements in properly tuned relation, the cam has the gear teeth 36 disposed around most of its periphery. This gear is a mutilated gear; that is the teeth extend all around the cam except for one portion 39 where five or six of the teeth are omitted, there being sufficient teeth omitted so that when this part of the cam member is adjacent the gear 35, the gear 35 may rotate without moving the cam. The position where the two gears are out of mesh is hereinafter referred to as the record playing position.

Means is provided for causing the cam member to be rotated to cause the teeth 36 of the cam gear to come in mesh with those of the spur gear 35, and the gear 35 to thus turn the cam substantially one complete revolution, during which the record changing cycle is accomplished. This means comprises a clutch which is released either manually or by the pickup arm and which engages with splines on the turntable spindle to start movement of the cam, and which is then later re-set before the completion of the revolution so that when the cam member comes again to the record playing position where the mutilated portion is adjacent the spur gear, the turntable may revolve without movement of the cam.

More specifically, the clutch includes a dog 40, Figs. 6 and 7, comprising a generally flat elongated member having a spline engaging point 41 and which member is pivotally secured to the under side of the cam at 42. A spring 43, Fig. 7, engages a pin 47 on the dog and normally urges it outward toward the periphery of the cam so that when released, the point 41 extends out into the mutilated spaced portion 39, Fig. 6, where there are no teeth 36 on the cam member. In this position the dog is in position to be struck by one of the splines 44 on the hub of the turntable spindle. These splines are disposed immediately below the spur gear 35 and are somewhat longer than the teeth of the gear and four in number. This could well be accomplished with one such spline, but having four such splines causes the changing mechanism to start into operation in less than one-quarter revolution of the turntable, thus shortening the cycle for changing the record. One of the splines 44 on the rotating spindle hits the end 41 of the dog 40, Fig. 6, which movement is transmitted to the cam and causes the cam to be pushed around until the teeth of the spur gear 35 meshes with the teeth 36 on the cam.

The dog is normally held out of spline engaging position by a latch 46 which is pivotally supported on the upper cam member. The pin 47 on the dog extends upward through a window 48 in the cam member, and is engaged by the notched end 49 of the latch 46.

The latch member is of angular formation, as best shown in Figs. 3 to 5 inclusive, being pivotally supported at 50 with the notched end 49 disposed over the window 48. The outer end of the latch is provided with an upstanding portion 51 in which is adjustably disposed a screw 52 adapted to be contacted by a cam follower arm 53 rigidly connected to the pickup arm 54, as best illustrated by the dotted lines in Fig. 3. It may be desirable for convenience in adjustment, to have the screw 52 threaded through the arm 53. In this instance the screw would contact the abutment 51.

The pickup arm 54 may be a conventional type having a pickup in which is secured a record groove-engaging stylus and the usual electrical connections and apparatus for converting the vibrations into audible frequencies. A support for the arm is provided and constitutes a hollow post 55, Fig. 17, disposed in an upright position on the frame 1, being provided with a flange 56 for engagement with the upper side of the frame 1; and a threaded extension 57 extending through the frame to the underside where it is secured by a nut 58. A cylindrical sleeve 60 extends through the post and has secured to its upper end at 59 a coupling 61. The coupling 61 rests on top of the post 55 and has a pair of upstanding parallel portions 62 through which a hinge pin 63 extends for hingedly securing the pickup arm 54 to the coupling. The other end of the sleeve 60 extends below the bottom of the post 55 and has clamped on its end the cam follower arm 53. It will thus be seen that the pickup arm and cam follower arm which may be in alignment with each other, are free to move arcuately above and below the frame or table 1 except when purposely held as hereinafter described. The end of the cam follower arm 53 is formed with a cam follower pin 65 for engagement with a cam as hereinafter more fully described.

A shaft 66 extends through the sleeve 60 protruding beyond the upper and lower confines of the sleeve 60. The upper end of the shaft is adapted for engagement with an adjustable abutment 67 carried on the underside of the pickup arm, and the lower end of the shaft has a rounded head 68 which is adapted to ride on a cam surface 77. The cam surface for sliding the shaft 66 in the sleeve 60 is concentric with the axis of the cam member and of varying height, since the shaft 66 in the sleeve 60 rides on the cam, it is raised and lowered according to the elevation of the cam, which movement causes the pickup to also be raised and lowered in properly timed relation to the other movements of the mechanism. A helical spring 69 having one end abutting the bottom end of the sleeve 60 or arm 53 and the other end abutting the head 68 holds the head 68 in engagement with the cam. This spring, as will hereinafter appear (Fig. 3a), not only holds the shaft 66 in contact with the cam, but causes the head 68 to index or hold the cam in place during the record playing portion of the cycle.

As previously stated, the dog or pawl 40 is normally held out of the path of the splines 44. That is, when the cam member 37 is at rest, which position is best shown in Fig. 3, the pin 47 on the dog is engaged in the notch 49 of the latch 46. The pickup arm with the stylus following the sound groove is drawn by the groove gradually toward the center of the record until near the end of the playing groove it enters the steeply pitched portion of the groove near the center of the record. This causes the arm 53 to move quickly toward the center of the turntable and strike the screw 52 which rotates the latch 46 around its pivot 50 counterclockwise, as viewed in Fig. 3, and releases the pin 47 on the dog from the notch 49. The spring 43 bearing against the pin swings the dog outwardly into the path of the splines 44, which splines engage the end of the dog which has taken the position shown in Figs. 4 and 6, The pin 47 rests against the side of the window 48 and pressure from the spline 44 is transmitted through the dog to the cam, causing the cam to be moved until the teeth 36 on the cam mesh with the teeth of the spur gear 35 and driving relation between the cam and the spindle is accomplished.

A spring 70 having one end connected to the latch and the other end to a pin on the cam, urges the lever 46 in a clockwise direction around its pivot 50, so that the face 46' on the latch (Fig. 4) engages the pin 47, along which face the pin is adapted to slide when the dog is reset until when it is moved and re-engaged in the notch 49. The dog remains in the unlatched position for nearly one complete revolution. As the mutilated portion of the cam gear approaches the spur gear near the end of the cycle, the dog 40 (see Fig. 7) strikes against a reset abutment 71, which abutment being in the path and travel of the dog, causes it to move back into locking engagement with the latch. At this point the cam has completed its cycle and has rotated to a position where the gear teeth no longer mesh and the cam then comes to rest in the record playing position.

When the pickup arm reaches the end of the record groove and the cam is started in motion, as just described, the first movement in the cycle is the raising of the pickup arm. This is then followed by swinging the pickup arm to one side of the table, after which the new record is released onto the table and then the pickup arm is swung back to the table in alignment with the start of the record groove; then it is gently lowered into the groove.

The raising of the tone arm at the start of the changing cycle is accomplished by movement of the cam surface 77 which extends around the cam member adjacent the gear teeth, the cam surface being concentric with the axis of the cam member relative to the end or head 68 of the shaft 66 which rides thereon. During the playing period the end 66 of the head is disposed on a low spot or zone on the cam, indicated at 75 (Fig. 3a), this being the point where the pickup arm is out of contact with the upper end of the shaft 66 and the stylus resting in the record groove. From the point 75 the cam surface inclines upward, as indicated at 76, to the upper and highest surface 77, which surface is of even height around the cam until it again slopes downward at 76' to the low zone 75. It will thus be seen that when the cam is revolved, the head 68, which at the start is in the low zone 75, rides up the inclined surface 76, causing the shaft 66 to move upward. The shaft engages the tone arm abutment 67 and raises the tone arm up off of the record.

At the start of the record changing movement, if a record has just been played, the pickup arm is at or near the center of the turntable and the cam follower arm 53 has also moved across the unobstructed surface 82 of the cam to the position shown by the dotted lines in Fig. 3. It should be borne in mind that the cam follower arm 53 moves only in a horizontal plane. The cam plate is also provided with cam tracks to control the swinging movement of the pickup arm, the pickup arm being guided into its various positions by contact of the pin 65 on the arm 53 with the upstanding ridges or ribs on the cam which form the boundaries of the tracks.

As best shown in Fig. 3, the walls or ribs 80 and 81 of the track diverge widely to provide a larger area or zone 82 in which the arm 53 and pin 65 may swing freely when the cam member is at rest. Thus the pickup arm may also swing freely while the record is being played, the only limitation being the inner and outer limits of the ribs 80 and 81. The outer wall 81 may conveniently be the inner edge of the tone arm raising cam surface 77.

The cam element having started to rotate at the end of the playing of a record, as previously described, the inner rib 80, which slants toward the outer rib 81 at 80*a*, strikes the pin 65 and rotates cam follower arm 53 and the pickup arm, which has just been lifted, outward beyond the edge of the turntable. The cam follower arm 53 and pin 65 ride along the surface 80*a* until it enters into the narrow track 80*b* adjacent the edge of the cam. While in this groove lateral movement of the arm is prevented. While thus engaged the pickup arm is disposed beyond the edge of the turntable and cannot accidentally be swung over the turntable while the record changing is being accomplished. The narrow track 80*b* extends around the edge of the cam approximately 180°. At this point the track divides to form two concentric tracks, one track adapted to return the arm to the proper position for being lowered on 10'' records, and the other for 12'' records.

While the cam is rotating with the pickup arm under control of the portion 80*b* of the cam track, a new record is being deposited on the table by a means hereinafter to be described, the depositing operation being completed by the time the pin 65 and arm 53 reaches the end of the narrow track portion 80*b*.

At this point, as previously stated, the cam track divides into two tracks 80*c* and 80*d* which tracks are for 12'' and 10'' records respectively and open into the open zone 82. The pin 65 is guided into track 80*c* or 80*d* by a switch 83, the position of which is controlled by the position of the record supporting mechanism. That is, if 12'' records are being played, the switch is in the position shown in Fig. 10, where the follower pin passes into track 80*c*. If 10'' records were being played, the switch would take the dash line position where the follower would be guided into the track 80*d*. This is the position shown in Figs. 3 to 5 inclusive. The cam continuing its rotation and the follower arm and pin being guided by switch into the track 80*d*, the pickup arm is thus moved back over the turntable. Just before the pin 65 leaves the track 80*d* the pickup arm is lowered by the shaft 66, the raising head 68 traveling down the incline 76' of the cam, onto the outside edge of the record groove. Immediately after the pin 65 leaves the groove 80*c*, the mutilated portion 39 of the gear 37 arrives opposite the gear 35 and, since there are no teeth to mesh, the cam member stops and the playing of the record is in progress. The head 68 in the low spot 65 holds the cam member against further movement.

As previously stated, the records are supported at their centers on the spindle 23 and their edges at one side of the turntable by a platform or table. This platform, as best shown in Figs. 12 to 16 inclusive, comprises a hollow pedestal 85 having a boss 86 engaging the upper side of the frame 1 and provided with a threaded end 87 which extends through a hole in the frame and is securd in place on the frame by a hex nut 88. A sleeve 89 extends through the pedestal and has secured to its upper end a flat plate 90. The lower end of the sleeve extends below the lower end of the pedestal and has rigidly secured thereto a cam plate 91. The cam is a flat circular plate (Figs. 3 to 5 inclusive) and is eccentrically mounted on the sleeve 89. The cam plate is adapted to be held in either one of two positions by a spring member 93 which engages in either the opening 70 or 70'. A cam track switch positioning member 94 is slidably supported by rivets or screws 95 on the underside of the frame, which rivets extend through slots 95' in the member 94. The member 94 is provided with a cam engaging abutment 92, and is held against the cam by a helical spring 97 having one end secured to the table or frame and the other attached to the member 94. The free end of the switch positioning member extends above the cam member 37 and is provided with a pair of downwardly extending spaced guides 98 which converge toward each other in the direction of rotation of the cam member. The guides are placed in the path of travel of a pin 99 on the switch 83, which pin extends upwardly from the body of the switch 83, as best shown in Figs. 3, 4 and 10. When the cam member 37 is rotated the switch 83 is adapted to be moved into its proper position to select the correct track 80c or 80d for the follower arm pin 65. The pin 99 engages with one or the other of the guides 98 which swings and guides the same between the narrow opening as the pin leaves contact therewith to leave the switch in its proper position. The guide of course is positioned by its contact with the cam plate, the drawings illustrating the position taken for 10'' records.

The plate 90 supported on top of the sleeve 89 extends further to one side than the other, as shown in Figs. 2 and 12. When the cam 91 is so disposed that the longer radius is toward the turntable, the plate has its short side toward the turntable and the support (as will later appear) is thus adjusted for 12'' records. In this position the guides 98 will set the switch 83 to select the proper track to return the pickup for playing 12'' records. In case 10'' records are loaded on the device, the long side of the platform is toward the turntable and the the short radius of the cam is used to position the track setting member 94. Since the cam plate is held indexed by the spring member 93, the platform is thus held in its proper position. The platform may be rotated manually so that the spring member 93 engages either one of the openings 70 or 70', depending on which size of records that are going to be played.

A record supporting and ejecting mechanism is supported on top of the platform 90 and comprises a slide 100 (Figs. 15 and 16) slidably disposed on top of the platform 90. The body of the slide is of rectangular formation and has pairs of arms at opposite ends, each of which extends laterally at 101 and vertically at 102. The outer edges of the upwardly extending portion incline downwardly at 103, the purpose being to prevent the slide arms from slipping off of the edge of the record. Along the center line of the slide and at one end is formed a square opening 104, the edges normal to the longer axis having upstanding flanges 105, Figs. 12, 15 and 16. The flanges are disposed for engagement with the edge of a cam 106 which comprises a circular disc eccentrically carried on a shaft 107 rotatably disposed in the sleeve 89. Rotation of the cam reciprocates the slide on the platform. The cam 106 is eccentrically secured on the reduced end 107' of the shaft 107 which extends through an opening in the cam and is secured thereto by staking, welding or soldering. A pin 106' in the center of the cam rests on the plate 90, and when the cam is rotated, slides on the plate around the end of sleeve 85 where it extends through the plate and is staked over. This lends additional support to the cam.

The body of the slide 100 is narrower crosswise than the platform 90 and is held and guided on the platform by a head 108, which head not only supports the edge of the stack of records, but covers the record ejecting mechanism on top of the plate.

The head 108 comprises a substantially rectangular hollow body, Fig. 1, having downwardly extending lugs or bosses 110, which engage the plate 90, Fig. 13, and extend between the arms 102 of the slide. The inner sides of the lugs form a guide for the slide 100. A downwardly extending flange 109 extends around the remainder of the head connecting in the mid-section to the bosses 110 which extend below the flange a distance slightly greater than the thickness of the slide (see Fig. 2). The head is secured to the platform by screws 111 which extend through the bottom of the platform into threaded openings in said bosses.

The spring member 93 includes a bracket 130 secured to the bottom of the frame 1 and extending downwardly to provide a support 131 disposed in spaced parallel relation to the frame 1. The arm 93 is secured to the support 131 by rivets 132 and the end of the spring terminates in a U-shaped end 93' for engagement in the openings in the cam. An arm 133 integral with the support extends below the spring arm 93 and is provided with an adjusting screw 134 threaded therein and having the end in engagement with the spring whereby tension on the spring may be adjusted.

It will thus be seen that the head holds and guides the slide on the platform while allowing the slide to be easily reciprocated by the cam 106. The vertical arms 102 of the slide extend up beside the edges of the head and slightly above the upper surface thereof, the extension above the head being less than the thickness of a standard 10'' record. The edge of the stack of records rests on the portion of the head which extends toward the turntable (Fig. 2), the arms 102 of the slide being in a position to engage the edge of the bottommost record and still miss the record juxtaposed above.

The slide is moved by the cam 106 to engage the edge of the bottom record, which edge rests on the head and has the center resting on the seat 22 of the record spindle 17, to slide the record off of the seat against the portion 24a, whereupon the hole in the record is aligned with the head 22 and at which time the slide pushes the edge of the record off of the head and the record drops down around the record spindle 17 to the turntable.

All of this is accomplished during the time when the pickup arm is at one side of the turntable as described.

In bringing about this operation, the cam 106 is rotated by means of the shaft 107 which extends below the frame 1 and pedestal 85. The end of the shaft 107 has a lever 114 secured thereto; this lever is connected by a link 115 to the main operating lever 116.

The lever 116 is pivotally connected at 117 to the under side of the frame and extends under the frame 1 above the cam member 37 adjacent the cam axis (see Figs. 3 and 5). The cam member 37 has an upstanding pin 118 rigidly carried thereby which, when the cam member 37 is rotated, engages the side of the lever 116 near the end, slides along the lever and rotates it about the pivot against the pressure of the spring 119, which spring holds the lever toward the center of the cam member. The lever 116 being rotated and being connected by the link 115 to the shaft lever 114, this rotation is transmitted to the shaft 107 and causes the record to be ejected. Fig. 3 shows the position taken by the linkage prior to operation, and Fig. 5 shows the position taken when the linkage is at the peak of its travel. The cam member continues on its circular orbit and the lever 116 is brought back to its starting position by the spring 119 which returns the slide back to position to engage the next record.

Means is provided for steadying the stack of records and holding them on the platform and comprises a hollow boss 120 on top of the head which pivotally carries a yoke 121 having an end 122 which rests on the uppermost record. The yoke extends through the boss and is provided with a crank portion 123 to which is secured the end of a spring 124, the other end being connected to a cross pin 125 disposed below the boss.

Means is provided for engaging the clutch which will cause the changer mechanism to start functioning without respect to the position of the tone arm or the record groove which is useful, not only to start the first record, but also to reject certain records if desired.

This means comprises a stiff wire rod 125, Fig. 3, slidably supported by the frame 1 in lugs 126 and having one end extending through the frame and connected to a slidable button and the other end below the frame adapted to contact the upstanding flange 51 on the latch 46. Movement of the button is transmitted to the latch which is rotated causing the latch to be disengaged from the dog and starts the cam moving as previously described.

Summarizing the operation, a stack of 10″ or 12″ records is placed on the head and spindle. If 10″ records are being played, the head is moved to the position shown in Figs. 1 and 2. If 12″ records are being played, it is rotated 180°. The stack of records rests at its center on the spindle head 22 and at its edge on the head 108. The lever 121 is placed in contact with the upper edge of the stack where it is held in contact by the spring 124. The records when stacked on the changer are disposed in a horizontal position. The driving motor is energized by the switch 130 which may be any type. The connections from the source of current to the motor 30 are conventional and well known. Energization of the motor starts the turntable to turning. The slide 127 is then moved which causes the clutch to be released. The pickup arm is then raised and moved to one side of the turntable where it is held. The slide 100, the arms 102 of which are in engagement with the edge of the lowermost record of the stack, then moves inwardly carrying with it the record which then drops to the turntable.

The pickup arm then returns between the stack of unplayed records and the record on the turntable, the position of return being determined by the position of the head 108. It is then lowered into the record groove. The clutch at this point is reset and the cam mechanism stops. The record is then played. At the end of the playing the cam follower arm 53 engages the stop 51—52 and starts the record changing cycle anew.

It will thus be seen that there has been provided a mechanism well adapted to carry out the objects of the invention; that the mechanism is simplified, economical in construction and extremely rugged.

Although I have shown two control buttons, 127 and 130, I contemplate including these functions in a single rotatable knob which when rotated in one direction rejects the records and in the other turns on the motor.

Having thus described the invention in an embodiment thereof, it will be apparent to those versed in the art that many minor changes and deviations from the exact construction shown can be made without departing from the spirit or scope of the invention.

I claim:

1. A mechanism of the class described comprising a frame, a turntable supporting spindle rotatably carried by the frame, drive means for the turntable supporting means for supporting records to be played in a horizontal position comprising a stationary spindle extending into the turntable spindle for supporting the records at their center holes, a support and ejector mechanism for supporting the edges of the records and ejecting the supporting records one at a time disposed to one side of the turntable comprising a pedestal secured to the frame, a sleeve rotatably journalled on the pedestal and carrying the record support and ejector on top, a shaft extending through the sleeve and carrying a cam on its upper end, said cam being cooperatively connected to said ejector, cam means rotatably supported by said frame, an upstanding post on said cam and a lever pivotally carried by the frame and operable by contact with said post, a lever carried by said shaft and a link connecting the pivoted lever to said shaft lever, said post adapted to rotate the pivoted lever and hence said cam on said shaft to cause said ejector mechanism to eject records from the support and drop them singly onto the turntable.

2. A support and ejector for automatic record players having a frame, a turntable, and a fixed center spindle for supporting records at their center holes comprising a post carried by the frame at the side of the turntable, a sleeve rotatably journalled in said post, a base carried by said sleeve above said post, a record ejector slide disposed on said base and formed with pairs of arms on opposite ends thereof, an opening disposed in the mid-portion of said slide at unequal distances from the ends, a shaft rotatably disposed in said sleeve and provided with a cam disposed above said base and in engagement with the walls of said slide in said opening, said shaft being movable to reciprocate said slide, a record supporting platform secured to said base and formed to provide guide means for said slide to hold and guide said slide in desired oriented position on the base, said platform being provided with record supporting portions disposed in unequal distances from the sleeve and said slide arms extending from below said platform above said platform a distance less than the average thickness of a phonograph record and adapted for edge engagement therewith.

3. A support and ejector for automatic record players having a frame, a turntable, and a fixed center spindle for supporting records at their center holes comprising a post carried by the frame at the side of the turntable, a sleeve rotatably journalled in said post, a base carried by said sleeve above said post, a record ejector slide disposed on said base and formed with pairs of arms on opposite ends thereof, an opening disposed in the mid-portion of said slide at unequal distances from the ends, and means extending through said sleeve into said opening for reciprocating said slide, a record supporting member secured to said base and formed to provide guide means for said slide to hold and guide said slide in desired oriented position on the base, said platform being provided with record supporting portions disposed in unequal distances from the sleeve and said slide arms extending from below said platform above said platform a distance less than the average thickness of a phonograph record and adapted for edge engagement therewith.

4. A support and ejector for automatic record players having a frame, a turntable, and a fixed center spindle for supporting records at their center holes comprising a post carried by the frame at the side of the turntable, a sleeve rotatably journalled in said post, a base carried by said sleeve above said post, a record ejector slide disposed on said base and formed with pairs of arms on opposite ends thereof, an opening disposed in the mid-portion of said slide at unequal distances from the ends, and means extending through said sleeve into said opening for reciprocating said slide, a record supporting member secured to said base and formed to provide guide means for said slide to hold and guide said slide in desired oriented position on the base, said platform being provided with record supporting portions disposed in unequal distances from the sleeve and said slide arms extending from below said platform above said platform a distance less than the average thickness of a phonograph record and adapted for edge engagement therewith, and means extending above said platform and an arm carried thereby and movable to alternate positions above said record supporting positions and spring means for holding the arm in spring pressed relation in either of two alternate positions above said record supporting seats on top of a stack of records to hold the records on said platform.

5. In a record changer phonograph of the type in which a plurality of records either of one diameter or another are stacked above the turntable and are individually fed therefrom to the turntable by releasing the bottom record of the stack, a record supporting and feeding apparatus comprising a centrally located spindle having a part for supporting the bottom record of the supported stack at its center, a rotatable member for supporting said record at its periphery, said rotatable supporting member being rotatable between a position for supporting records of a small diameter and a position for supporting records of a large diameter and having means for peripherally supporting small diameter records in said first position and large diameter records in said second position, and a record feeding member movably mounted relatively to said record supporting member having a part for engaging the periphery of the large diameter record when the said supporting member is in a position for supporting a large diameter record and having a part for engaging the periphery of a small diameter record when the said supporting member is in a position for supporting a small diameter record, and means for operating said record feeding member to shift the supported record from its supports and thereby release the same for movement to the turntable.

6. In a record changer phonograph of the type in which a plurality of records either of one diameter or another are stacked above the turntable and are individually fed therefrom to the turntable by releasing the bottom record of the stack, a record supporting and feeding apparatus comprising a centrally located spindle having a part for supporting the bottom record of the supported stack at its center, a rotatable member for supporting said record at its periphery, said rotatable supporting member being rotatable between a position for supporting records of a small diameter and a position for supporting records of a large diameter and having means for peripherally supporting small diameter records in said first position and large diameter records in said second position, and a record feeding member rotatable with but shiftably movable relative to said rotatable supporting member, said record feeding member having a part for engaging the periphery of the large diameter record when the said supporting member is in a position for supporting a large diameter record and having a part for engaging the periphery of a small diameter record when the said supporting member is in a position for supporting a small diameter record, and means for operating said record feeding member to shift the supported record from its supports and thereby release the same for movement to the turntable.

ARNOLD W. LELINE.

REFERENCES CITED

The following references are of record in the file of this patent:

UNITED STATES PATENTS

| Number | Name | Date |
|---|---|---|
| 2,237,340 | Downs | Apr. 8, 1941 |
| 2,270,995 | Compare | Jan. 27, 1942 |
| 2,286,490 | Knox | June 16, 1942 |
| 2,328,052 | Butler | Aug. 31, 1943 |
| 2,355,790 | Faulkner | Aug. 15, 1944 |
| 2,357,520 | Kahl | Sept. 5, 1944 |